United States Patent
Nolt et al.

[11] 3,722,934
[45] Mar. 27, 1973

[54] TWINE FINGER FOR KNOTTER MECHANISM OF A BALER

[75] Inventors: Edwin B. Nolt, New Holland; Irwin D. McIlwain, Lancaster, both of Pa.

[73] Assignee: Sperry Rand Corporation, New Holland, Pa.

[22] Filed: July 1, 1971

[21] Appl. No.: 158,746

[52] U.S. Cl. ................................................289/13
[51] Int. Cl. .............................................B65h 69/04
[58] Field of Search....................................289/2, 13

[56] References Cited

UNITED STATES PATENTS

| | | | |
|---|---|---|---|
| 3,419,300 | 12/1968 | Nolt et al. | 289/13 |
| 3,419,301 | 12/1968 | Eby | 289/13 |

*Primary Examiner*—Louis K. Rimrodt
*Attorney*—John C. Thompson et al.

[57] ABSTRACT

A pivotally mounted twine finger has a hook portion and lateral extension at the forward end under the knotter unit of a baler and an opening between the extension and hook portion. A latch is pivotally mounted on the lateral extension and has a projection extending across the entrance of the opening. The projection is held in a closed position by a resilient bias on the entrance side of the pivotal connection and in a non-contacting, overlapping relation with the hook portion by an anvil on the other side. The latch prevents the leading and trailing strands of twine from escaping from the opening through the entrance as the twine finger holds the strands taut against the bill hook during the twisting operation, the pulling of the twisted strands along the bill hook to form the knot and the assisting in pulling the knot from the bill hook. A forwardly facing straight edge on the latch generally spans the pivotal connection and anvil to distribute forces on the latch to the twine finger. The edge is engaged by the leading strand during baling and guides the leading and trailing strands into the opening on the pivotal movement of the twine finger on the commencement of the knotting operation.

10 Claims, 16 Drawing Figures

Patented March 27, 1973

INVENTOR.
EDWIN B. NOLT
IRWIN D. McILWAIN
BY
George C. Bower
ATTORNEY

Patented March 27, 1973
3,722,934
3 Sheets-Sheet 2
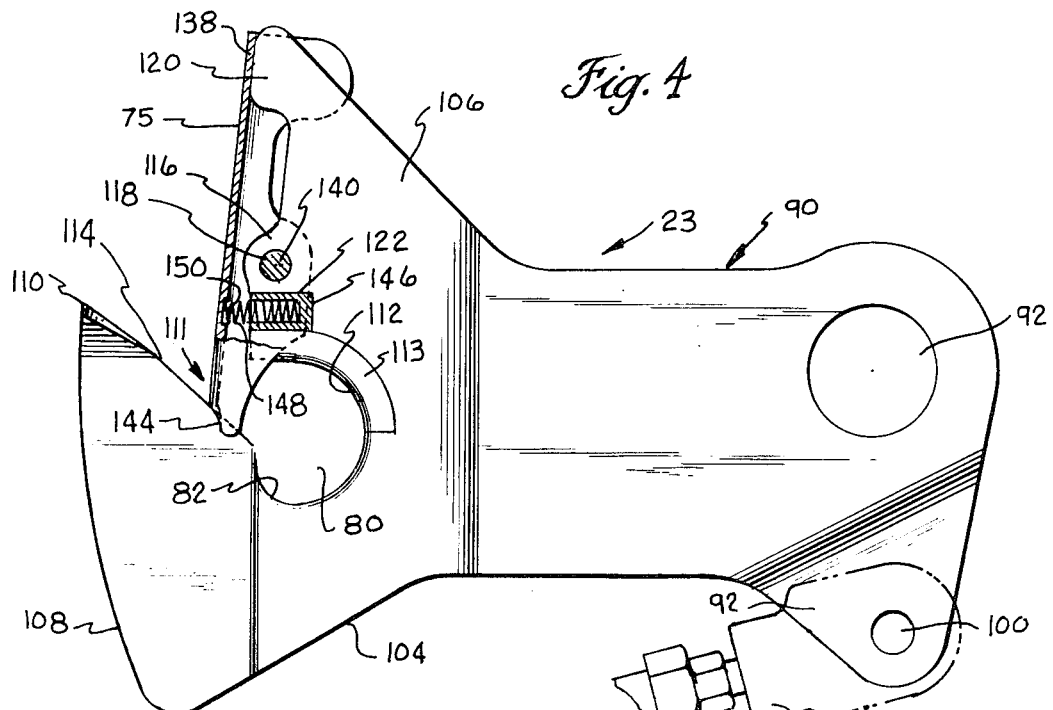
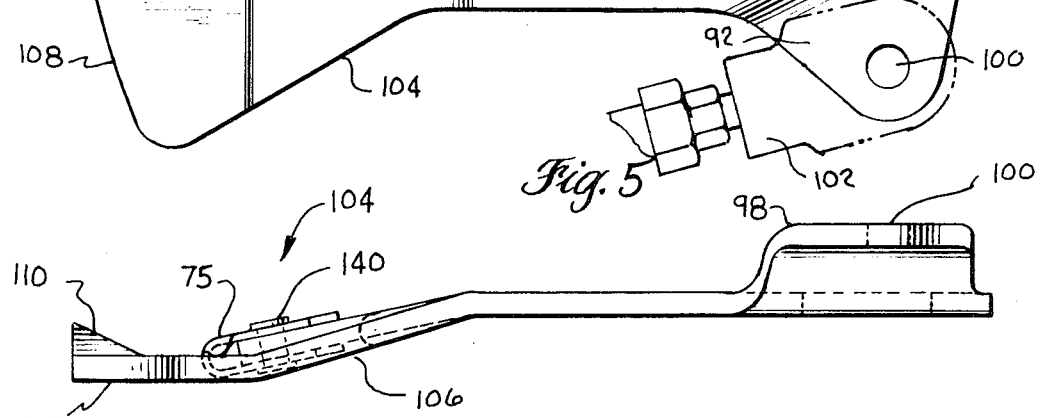
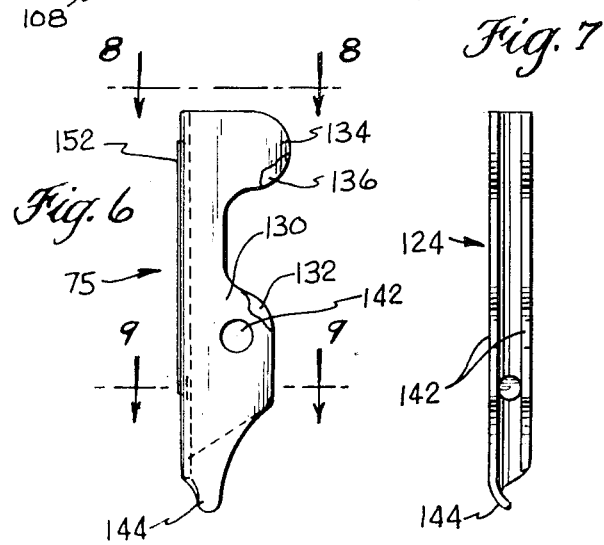
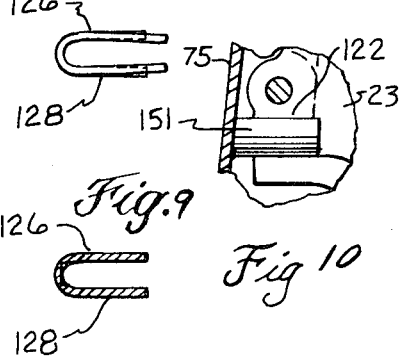
INVENTOR.
EDWIN B. NOLT
IRWIN D. McILWAIN
BY
George C. Bower
ATTORNEY

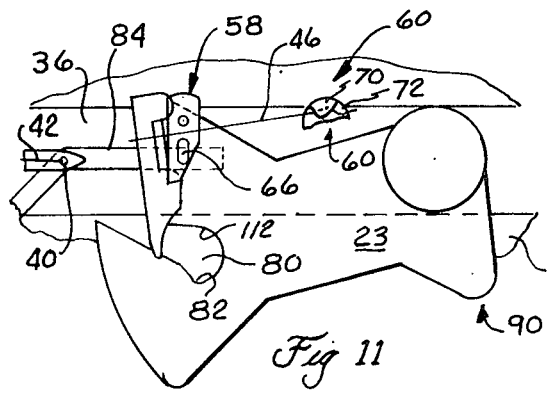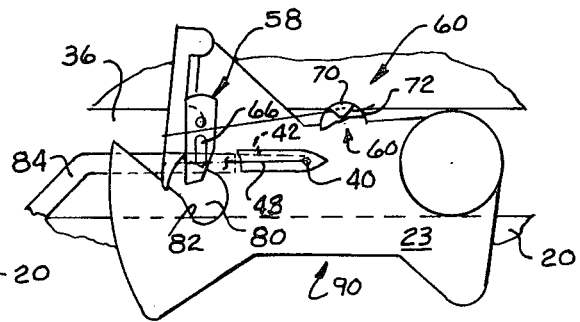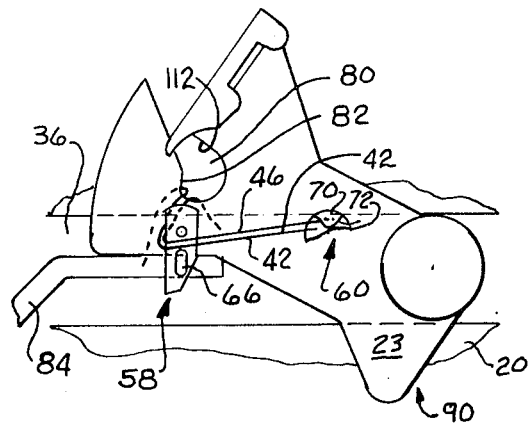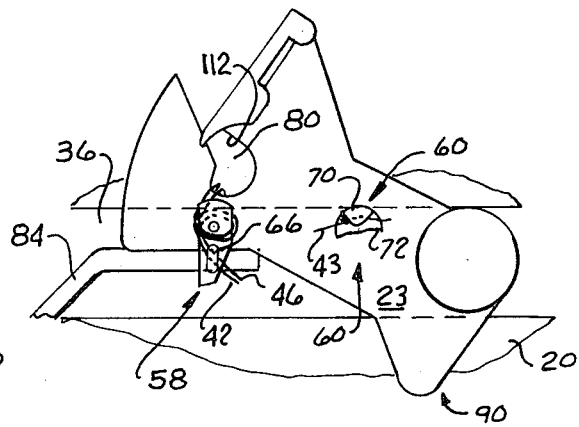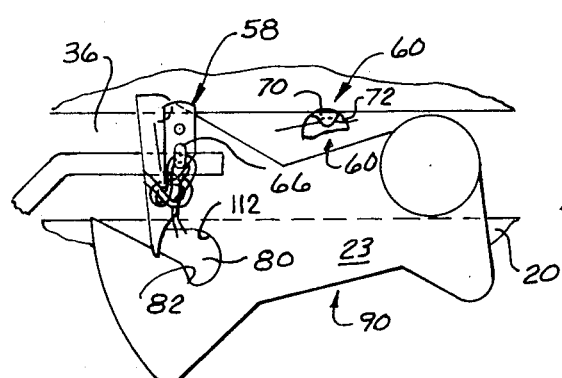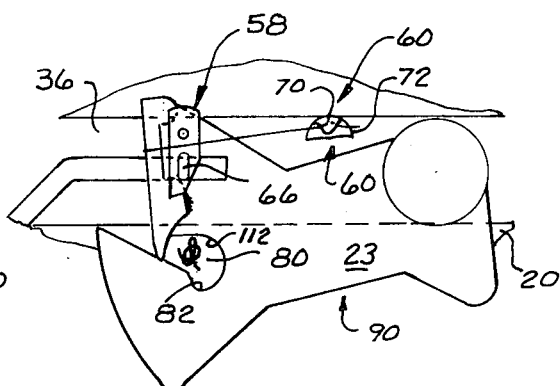

TWINE FINGER FOR KNOTTER MECHANISM OF A BALER

BACKGROUND OF THE INVENTION

This invention relates to knotter mechanisms for balers of crop material and is directed particularly to twine fingers cooperating with knotter units for tying knots.

In present mobile pull type and self-propelled balers, the picked up crop is automatically fed to the bale chamber and formed into a bale. The bale is held together by a loop of twine tied by a knotter mechanism. The operation of the knotter mechanism is precisely timed in the twisting and tying of the strands of twine into a knot. This precisely timed operation is subject to abuse and wear by the vibrations of the baler, the tensions of the strands of twine and the jarring of the baler as it moves through the field. The crop may be tough or resilient causing the strands to jump about. Variations in the baling twine also affects the knotting operation. Balers are operated outside and often parked in the fields. The knotter mechanism is, therefore, also subject to the weather and exposure. This requires the elements to be operatively little effected by moisture and the like. Further the knotting environment is full of dirt, crop and debris subjecting the parts to abrasion and interference in operation.

In the U.S. Pat. No. 3,419,300 issued on Dec. 31, 1968 and entitled "Twine Finger for Knotter Mechanism for Baler," a knotter unit and cooperating twine finger are described. The knotter unit is mounted on the bale case above a slot therein. On completion of a bale, the needle passes through the slot carrying the trailing strand of twine which extends around the trailing end of the bale. During the baling operation, the leading strand is held by the clamping unit and extends forwardly across the twine finger and bill hook and then in back of the bale. The twine finger supports the strand so that it does not bear forcefully against the bill hook. The advancing needle lays the trailing strand across the twine finger, bill hook and twine hook of the clamping unit. The twine finger captures these strands of twine and positively positions the strands against the heel of the bill hook for a tight formation of the knot. On completion of the operation of the knotter unit, the twine finger returns to the initial position to complete the knot and assist in the removal of the knot from the knotter unit on the discharge of the bale.

OBJECTS AND SUMMARY OF THE INVENTION

An object of this invention is to improve the durability of a twine finger and latch of a knotter mechanism.

Another object of this invention is to minimize the wear and deformation of a twine finger and latch of a knotter mechanism.

Another object of this invention is to provide a latch for a twine finger of a knotter mechanism that is less expensive to manufacture.

Another object of this invention is to reduce the maintenance and adjustment of the twine finger for proper operation.

Another object of this invention is to maintain the operation of the latch stable over large numbers of tying cycles.

In summary, this invention comprises a twine finger with a pivotally mounted latch having a stop on one side of the pivotal mounting and a projection and a resilient bias on the other side of the pivotal mounting, said resilient bias normally pressing the latch stop on the twine finger against an anvil to position the projection across the entrance of the strand retaining opening in non-engaging overlapping relation with the twine finger and said latch having an exterior strand engaging surface generally spanning said pivotal connection and stop for distributing strand forces to said twine finger.

These and other objects and advantages of this invention will be apparent from the following description and claims taken in connection with the accompanying drawings which illustrate the features of the invention.

BRIEF DESCRIPTION OF THE DRAWINGS

FIG. 4 is an enlarged plan view of the assembled twine finger and spring loaded latch.

FIG. 5 is a side view of the twine finger shown in FIG. 4.

FIG. 6 is a plan view of the latch.

FIG. 7 is an edge view of the latch.

FIG. 8 is an end view taken from line 8-8 of FIG. 6.

FIG. 9 is a sectional view taken along line 9—9 of FIG. 6.

FIG. 10 is a fragmentary view of the latch and twine finger illustrating the resilient block modification.

FIG. 11 is a top view illustrating the relation of the twine finger and bill hook at the commencement of the tying cycle.

FIG. 12 is a top view illustrating the twine finger partially moved to the right and the needle delivering the front strand of twine to the bill hook and clamp.

FIG. 13 is a top view illustrating the relation of the twine finger and bill hook at the commencement of the knotting operation.

FIG. 14 is a top view illustrating the relation of the twine finger and bill hook at the completion of the rotation of the bill hook.

FIG. 15 is a top view illustrating the relation of the twine finger and bill hook with the twine finger returned to the initial position pulling the twisted strands over the end of the bill hook to form the knot.

FIG. 16 is a top view similar to FIG. 15 illustrating the knot being pulled from the bill hook by the discharging bale.

DETAILED DESCRIPTION OF THE PREFERRED EMBODIMENT

Figures 1, 2, 3:
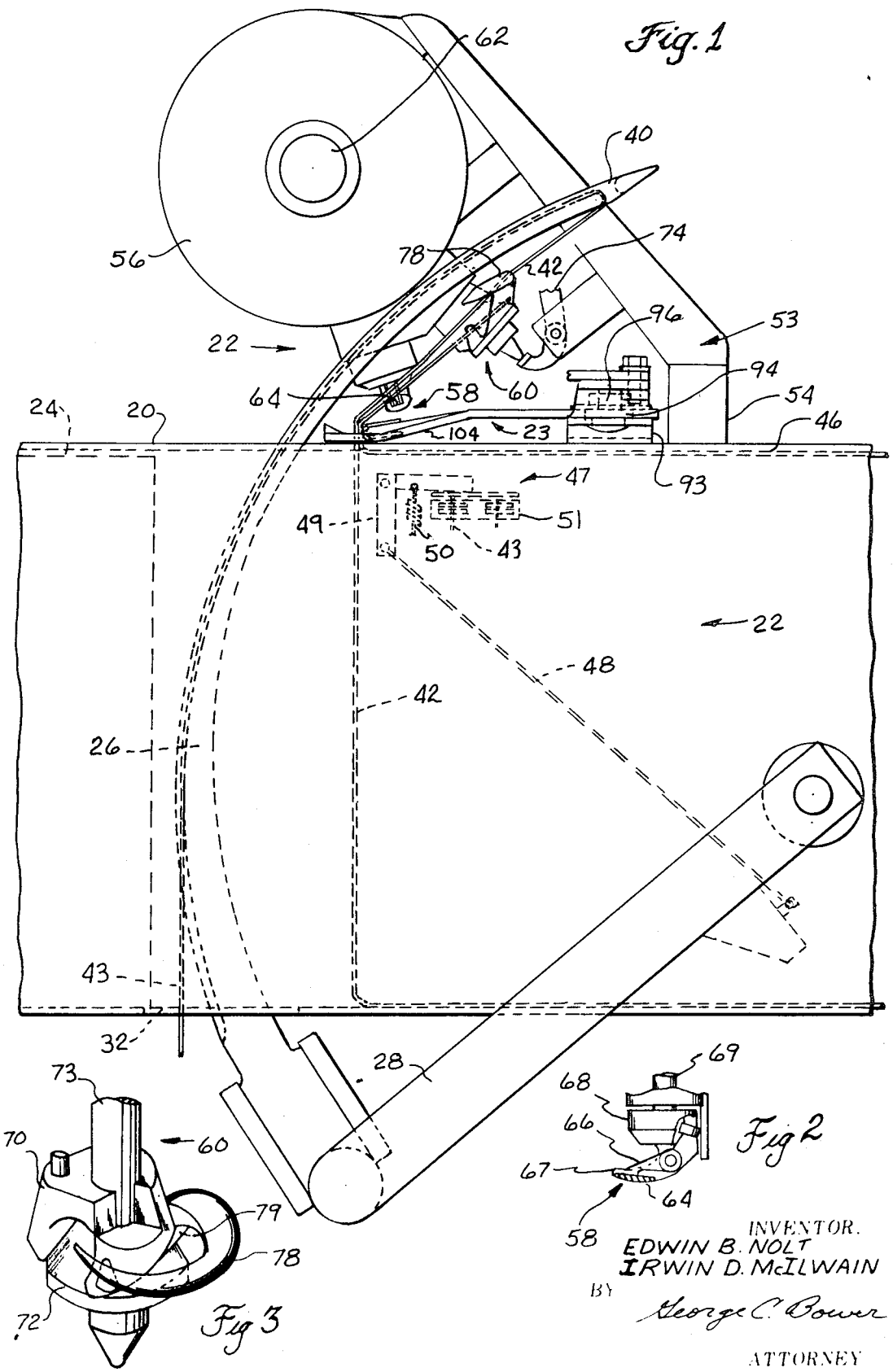
FIG. 1 is a side view of the bale case with the needle and knotter unit and twine finger mounted thereon.
FIG. 2 is a side view of the bill hook.
FIG. 3 is a side view of the twine clamp.

In the aforementioned patent, a detailed description of the cooperative operation of the knotter unit and prior twine finger is fully set forth. In that description, two knotter units, two twine fingers and two needles are shown operating in side-by-side relation to form two spaced loops around a bale. The present description is modified to show only one knotter unit, twine finger and needle. However, it is understood, that the present invention could be used in a multiple set of knotter units, twine fingers and needles. General operation of the aforementioned twine finger and the twine finger of this invention in connection with the knotter unit is substantially the same except as the present invention modifies this operation. In this description as in the aforementioned patent the leading strand extends over the top of the bale, down the rear and forward along the bottom and the trailing strand is drawn up by the twine needle along the front of the bale and over the forward portion of the top.

Referring to FIGS. 1 and 11–16 a fragmentary portion of bale case 20 with a knotting unit 22 and twine finger 23 on top, a feed opening 24 in the far side and the needle moving therethrough. A part of the feed opening 24 to the bale case is shown in dot and dash lines, in FIG. 1. The plunger (not shown) reciprocates in the bale case and presses the charges of hay delivered through the feed opening into slices to form the bale. In FIG. 1, the required size of bale has been formed in the baling operation and the trip arm (not shown) has been actuated to start the tying operation. The needle 26 has pulled the twine up the front of the bale. For the position of the needle, as shown in FIG. 1, the plunger is in a forward position.

As illustrated in FIG. 1, the needle 26 is mounted on a U-shaped yoke 28 pivotally mounted on opposite sides of the bale case. On actuation, the needle swings up through slots or openings 32 in the bottom of the bale case and through a long slot 36 (FIGS. 11–16) in the top of the bale case. The twine is threaded through an opening 40 in the tip of the needle to form the trailing strand 42 extending up the front of the bale and a return strand 43 extending down the front of the needle. The trailing strand 42 is joined by the knotter unit 22 with the top strand 46 extending over the top, around the back and along the bottom of the bale. The strand 43 is connected to the roll of twine (not shown) and is held in tension by the secondary twine clamp diagrammatically indicated at 47 in FIG. 1. This twine clamp is rendered operative when the needle commences its upward traverse. Thus, the twine is supplied under tension. The cable 48 releases the pivoted L-shaped lever 49 so that the spring 50 pulls the lever down to clamp the movable clamp member 51 against the twine. The twine clamp shown provides strands of twine for two knotter units.

The knotter unit 22 is mounted on a bracket or frame 54 which is secured to the top of the bale case 20 and extends forward to support the stationary housing 56. The housing encloses the drive means of the bill hook 58 and clamping unit 60. The gear and cam disc (not shown) is rotated by the drive shaft 62 which extends transversely across the bale case. The rotation of the bill hook 58 and clamping unit 60 is in a clockwise direction viewed downward towards the bale case. As best shown in FIG. 2 the bill hook 58 has a fixed, grooved jaw 64 and a tongue 66 pivotally mounted on the jaw for clamping twine between the tongue and jaw. The tongue is closed by the roller 66a engaging a fixed cam surface and opens when disengaged. The tongue 66 has a tooth 67 (FIG. 2) on the end for catching the clamped twine to form the loop. The heel portion of the bill hook is mounted on a collar 68 attached to the bill hook shaft 69. The collar has a large diameter extending over the jaw and tongue.

The clamping unit 60 has a fixed clamp 70 and a moveable or rotatable clamp 72 (FIG. 3). The rotatable clamp is mounted on a gear driven shaft 73 extending axially through the fixed clamp 70. The knotter unit is more fully explained in the U.S. Pat. No. 3,418,014, issued on Dec. 24, 1968 to E. B. Nolt et al. and entitled "Knotter Clamp Means for Baler." The rotatable clamp 72 is pressed into clamping engagement by the fragmentarily shown lever 74 which is pivotally mounted on the frame or bracket 54. The lever 74 applies a primary pressure and a secondary pressure to the moveable clamp. The primary pressure is applied during the baling operation and at the beginning and end of the knotting operation. During the knotting operation, the primary pressure is relieved and the lesser secondary pressure is applied to permit the trailing strand to be inserted or carried in between the fixed and moveable clamps 70 and 72 as the moveable clamp rotates.

During the paling operation, the clamping unit firmly holds the end of the leading strand. The strand extends forwardly over the bill hook and forward edge of the latch 75 (FIG. 5) on the twine finger 23 and, then, in front of the bale being formed. On the bale reaching a desired length, the trip arm (not shown) is actuated by a conventional metering wheel (not shown) to commence the knotting operation. The needle 26 carries the trailing strand 42 up the front of the bale, over the forward edge of the latch on the twine finger, onto the bill hook 58 and across the twine hook 78 (FIG. 3) on the rotatable clamp 72 (FIGS. 11 and 12). As shown in FIG. 1, the needle extends well beyond the twine hook and places the trailing strand 42 over the twine hook. The twine hook turns with the rotatable clamp and loops the trailing strand to carry it underneath the fixed clamp. On the final portion of the rotation of the clamp 72 the strand between the clamping unit and the bill hook is severed by the knife 79.

An essential feature of the twisting operation is that the clamping unit 60 maintains the leading strand 46 taut in cooperation with the compressed bale and that the needle through the secondary twine clamp 47 maintains the trailing strand 42 taut during the knotting operation. As part of maintaining the strands taut, the strands should be positioned at the heel of the bill hook for a proper knot formation. In FIGS. 11–16 the clamping unit is fragmentarily shown. Only the fixed clamp 70 and the rotatable clamp 72 are illustrated. The twine hook 78, FIG. 3 in its rotation cooperates with the primary twine finger in carrying the strands against the heel of the bill hook. A particular feature of this movement from left to right is the movement of the exterior straight edge of the latch. As best shown in FIGS. 11–13, the spacing or distance between the straight edge and the bill hook shortens to reduce strand tensions. As illustrated in FIGS. 13 and 14 the twine finger is moved to the right so that the edge 82 of the opening 80 draws the strands against the heel of the bill hook. As the bill hook turns, it twists the strands of twine and the tongue 66 of the bill hook opens in about the last 45° of the turn of the bill hook to grasp the two strands. At the clamping unit the trailing strand 42 enters between the fixed and moveable clamps just after the bill hook opens. The lever 74 is applying a secondary pressure so that the top strand is withdrawn by the bill hook and the trailing strand is entered in between the clamps. As the bill hook rotates it clamps the trailing and leading strands and closes to grip the strands as the top strand is pulled from the clamping unit and the trailing strand 27 is severed. The twine finger moves back to the initial position to pull the strands over the clamped ends and form the knot.

The twine finger performs four distinct operations in addition to other functions. One is during baling to carry the twine so that twine pressures are not applied to the bill hook. A second major operation is to move the strands over and hold the strands against the bill hook heel. Another major operation is to draw the twisted strands over the gripped ends to form the knot and, thirdly, to cooperate with the discharging bale to pull the knot off the end of the bill hook.

It should be kept in mind that the needle extends up through the center of the slot 36 with plenty of clearance on each side. However, as best illustrated in FIGS. 11–16, the clamping unit 60 and bill hook 58 are positioned to the side of the slot and, as seen in FIG. 2, the bill hook is under the collar 68. In order that the trailing strand is placed well on the bill hook by the advancing needle, a guide bracket 84 is mounted on the left side of the slot 36 and forces the trailing stand over to the left side of the slot and closer to the heel of the bill hook. Thus, the leading strand 46 and the trailing strand 42 are side-by-side on the bill hook.

With this brief description of the delivery of the trailing strand and the knotting operation attention is directed in detail to the new and novel latch 75 and modified twine finger 23. In order to fully appreciate the complexities of the problems previously mentioned it should be again pointed out that the bale case and knotting unit are subject to the vibrations of the feeding mechanism supplying charges of hay to the bale case and the plunger compressing the charges into slices for forming square shaped bales. The leading strand 46 is repeatedly subjected to this pulsating action of the plunger which causes the twine to pulsate and bearing against the twine finger. The tensions on the twine and the repeated baling operations place forces on the twine finger which, over extended baling operations, can cause wear and damage to the latch and twine finger. This wear and damage requires readjustment of the latch and deforms the latch and twine finger to the extent that the strands may escape from the opening. This results in a mistie. The twine finger and latch described in this application can better withstand the harsh action of the twine.

Referring to FIGS. 4–10 the new and novel twine finger 23 and latch 75 is shown in detail. The twine finger comprises a main portion 90 having an opening 92 for pivotally mounting the twine finger on the transverse bracket 93 spanning the slot 36 (FIG. 1). The twine finger pivots about a bushing 94 fitting in the opening 92 and fastened to the bracket by a fastening means 96. The main portion has a raised section 98 with an opening 100 for connection to the actuating rod 102 to the twine finger. The actuating rod moves the twine finger in time relation to the knotting operation. The main portion 90 is spaced above the top of the bale case as shown in FIG. 1. The forward or twine handling portion 104 is sloped and positioned downwardly adjacent to the bale case. The twine handling portion has a lateral extension 106 and a hook portion 108 extending parallel to the bale case. The lateral extension 106 is at a downwardly sloped angle at a slightly higher level than the hook portion 108. The hook portion 108 has a triangular, upwardly bent tip 110. The base of the hook is sloped downwardly in the forward direction to position the hook at a lower level than the lateral extension 106. The hook and lateral extension form an opening 80 with an entrance 111. The hook has an edge 82 and the lateral extension has an edge 112 substantially facing the edge 82. The edge 112 is rounded and may be on a hardened insert 113 to withstand the wear of the strands on being pulled off of the bill hook. The hook portion 108 has an edge 114 sloped to the entrance 111 of the opening. The lateral extension has a pivotal mounting portion 116 with an opening 118 and an anvil 120 on the opposite side of the pivotal mounting portion from the entrance 111 so that the mounting portion is between the entrance and the anvil. The slot 122 is provided between the mounting portion and the entrance 111 to receive a resilient means, later explained herein. The latch 75 has an U-shaped cross section, as best shown in FIGS. 8 and 9, with sides 126 and 128 for extending on opposite sides of the lateral portion. The sides 126 and 128 have mounting portions 130 and 132 and guides 134 and 136 slideably extending around the anvil. The stop 138 on the latch 75 engages the anvil. The latch is pivotally mounted on the mounting portion 116 by the pin 140 extending through the openings 142 in the mounting portions 130 and 132 and the opening 118 in the lateral extension to form a pivotal connection. The side 126 has a projection 144 which in the normal position of the latch extends across the entrance 111 in overlapping relation with the lower hook portion 108. As shown in FIG. 4, a holder 146 has a helical spring 148 fitting therein and in a recess 150 in the latch 75. A preferred form is shown in FIG. 10 wherein a resilient rubber block 151 is fitted in the slot 122 and resiliently presses against the latch 75. In the normal position, the stop 138 engages the anvil 120. With this arrangement, the anvil 120 counters through the rigid U-shaped configuration of the latch the twine forces on the latch. The latch will not bend or distort under repeated engagements of the stop and anvil. The projection 144 extends towards the hook 108 but is held in non-engaging overlapping relation with the hook by the latch extending down on both sides of the lateral extension to provide the U-shaped stiff configuration to the latch. A hardened, abrasive resistant straight surface 152 along the exterior forward facing edge of the latch is engaged by the leading and trailing strands. The surface is rounded or curved. The rearward forces applied by the strands are transferred to the anvil 120 and the mounting portion 116 to distribute these forces and prevent wear of the lateral extension and latch.

In the sides 126,128 of the latch between the stop 138 and the mounting portion 130,132 are notches 154 forming openings 156 between the latch and the lateral extension. These openings provide for discharge of debris within the latch and thereby assist in maintaining the latch clear in the heavily debris environment in which the twine finger operates.

It is seen from the foregoing description that a new and improved latch finger with a new and novel latch has been provided. This is rugged in construction, maintenance free and reliable in operation. The improved operation of the twine finger and latch is due to the latch and twine finger maintaining their shapes and their cooperative parts in proper relationship. This relationship is maintained because of the ruggedness of the construction of the latch, the double pivotal attachment of the latch to the twine finger extension and the case and directness of the movement of the strands of twine into the entrance of the twine finger opening.

The relationship of the twine bearing area, latch and twine finger extension is such that the baling tension forces on the strands of twine are transmitted through the latch to the twine finger extension or the twine finger counters these forces through the latch. The latch engages the extension at the spaced anvil and pivot and transfer of the strand forces therethrough.

The location of the anvil and pivot along the same edge portion of the twine finger accommodates the strong U-shape configuration fitting around both sides of the extension. This positioning of the latch on both sides of the edge portion of the twine finger extension provides for a greatly improved pivotal connection of the latch to the twine finger. The pivot pin extends through the twine finger extension and through the portions of the latch on each side of the extension. These spaced bearing areas on opposite sides of the extension distribute or divide the forces applied by the latch to the pivot pin. This better counters any torque or twisting movements applied to the pin. Thus, the distribution of the forces between the pivot and anvil and double attachment of the pivot to the pivot pin contributes to the extended life of the latch.

The anvil and pivot being along one edge portion of the twine finger extension provides for a straight twine baling area along the rounded edge of the latch. This straight edge and the latch projection provides for a straight surface for the strands to travel on entering the entrance of the opening. The U-shape configuration contributes substantially to the rigidity of the latch to resist bending or deformation. The resistance of the latch to deformation is important in maintaining the overlapping non-engaged relation of the latch projection and the twine finger hook portion. It is very desirable that the latch closely overlaps with the hook to prevent the strands from escaping from the opening. The stiffness, non-deformability and resistance to twisting is important in this relationship over extended operation of the knotter. Thus, the latch projection does not engage the hook portion and on extended use does not deform so as to engage the hook portion. The cooperating edge of the hook portion, therefore, does not become deformed through improper engagement by the latch projection and, by this engagement, open the space between the latch projection and the hook portion. The horizontal overlapping relation is, therefore, precisely maintained to block the escape of the vertical or substantially vertical strands from passing back through the entrance.

The lateral resistance to twisting and the rigidity of the latch also maintains the proper relation of the anvil and striking portion of the latch. There is no change in the relationship of the anvil and latch which would correspondingly cause a change in the relationship of the latch projection to the hook portion. Thus, the latch will maintain its pivotal action in the plane of the extension and not tilt laterally or longitudinally to alter the relationship of the lateral projection and the hook portion.

It is also seen from the foregoing description that the strands when in the opening engage the wear resistant surface of the twine finger extension and do not bear against the latch except as the strands may move about.

It is thus seen that the rugged construction and double pivotal mounting of the latch on the twine finger extension permits the latch to be subjected to the harsh conditions of the baling and knotting operations without undue wear or deformation. The latch has an extremely long operative life and better or comparable to the operative life of the other elements of the knotter mechanism.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features here and before set forth and as fall within the scope of the invention or the limits of the appended claims.

Having thus described our invention, what we claim is:

1. A knotter mechanism for a baler having a bale case with an opening in a side thereof and a plunger within the bale case for forming bales therein, said mechanism comprising:

a knotter unit mounted on the top of the bale case with the opening, said knotter unit including a bill hook and a clamping unit for first holding the terminal end of the strand of twine around the bale and then receiving another strand of twine completing the loop around the bale, a twine needle having a free twine bearing end and being supported upon said bale case for projecting of the free end through the opening to carry a strand of twine around the end of a bale in the tying position and position the end of the needle carried strand of twine into engagement with said bill hook and clamping unit along with said bale encompassing strand, means to move said needle as aforesaid when sufficient material to form a bale has been compressed into said bale case and means to actuate said knotter unit to tie the strands in a knot, a twine finger pivotally mounted at one end on said bale case adjacent said opening and between said bale case and knotter unit, said twine finger having a hook portion and lateral extension with respective facing edges on opposite sides of an opening defined by said portions and spaced to form an entrance to said opening, a latch having a mounting portion, a projection and stop portion on the opposite side of said mounting portion from said projection, a strand engaging surface extending in the direction of movement of said finger and facing the direction of approach of said needle, said lateral extension having an anvil spaced from said entrance and having means for pivotally connecting said mounting portion between said entrance and said anvil with the projection extending across said entrance in overlapping spaced relation with said hook portion and said stop portion engaging said anvil, said lateral extension also having resilient means positioned between said pivot connecting means and said opening to urge said latch to the closed position and said stop portion against said anvil, means for actuating said twine finger relative to said knotter unit in timed relation with said needle and said knotter unit for positioning said hook edge to draw the clamped strands. against said bill hook for the tying cycle and then for positioning said support portion edge at the completion of the knot to cooperate in pulling the knot from said bill hook as the tied bale is moved from the tying position.

2. A knotter mechanism as set forth in claim 1 wherein said latch is generally straight.

3. A knotter mechanism as set forth in claim 2 wherein said strand engaging surface is linear.

4. A knotter mechanism as set forth in claim 3 wherein said mounting portion and said means for pivotally connecting said mounting portion to said lateral extension are to the rear of said strand engaging surface in the direction of the strand applied forces.

5. A knotter mechanism as set forth in claim 2 wherein said latch is U-shaped in cross-section and formed by two spaced sides and said strand engaging portion interconnecting the sides and being curved, said sides fitting on opposite sides of said lateral extension and forming the mounting portions and the guides to the stop portion.

6. A knotter mechanism as set forth in claim 5 wherein said curved strand engaging surface is hardened.

7. A knotter mechanism as set forth in claim 5 wherein said projection extends from one of said sides to overlap said hook portion in spaced relation therewith.

8. A knotter mechanism as set forth in claim 1 wherein said anvil and pivoting means oppose forces applied by the strands to said surface in substantially the same direction.

9. A knotter mechanism as set forth in claim 8. wherein said anvil and said pivoting means are on the same side of the strand engaging surface.

10. A knotter mechanism set forth in claim 1 wherein oppositely disposed guide portions are provided on said latch to either side of the stop portion, the guide portions slideably extending around said anvil to hold said projection in a generally constant lateral plane.

* * * * *